United States Patent
Sydora et al.

(10) Patent No.: US 12,441,671 B2
(45) Date of Patent: Oct. 14, 2025

(54) METAL-CONTAINING IONIC LIQUIDS WITH REDUCED VISCOSITY

(71) Applicant: Chevron Phillips Chemical Company LP, The Woodlands, TX (US)

(72) Inventors: Orson L. Sydora, Sugar Land, TX (US); Corey W. Knight, Houston, TX (US); Jamie N. Sutherland, Porter, TX (US); Gregory G. Hendrickson, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 78 days.

(21) Appl. No.: 17/837,803

(22) Filed: Jun. 10, 2022

(65) Prior Publication Data

US 2023/0399276 A1 Dec. 14, 2023

(51) Int. Cl.
   *C07C 7/10* (2006.01)
   *B01D 53/14* (2006.01)
   *B01D 53/72* (2006.01)
   *B01D 53/78* (2006.01)
   *C07F 1/08* (2006.01)

(52) U.S. Cl.
   CPC ............ *C07C 7/10* (2013.01); *B01D 53/1487* (2013.01); *B01D 53/1493* (2013.01); *B01D 53/72* (2013.01); *B01D 53/78* (2013.01); *C07F 1/08* (2013.01); *B01D 2252/30* (2013.01)

(58) Field of Classification Search
   None
   See application file for complete search history.

(56) References Cited

U.S. PATENT DOCUMENTS

| | | |
|---|---|---|
| 6,339,182 B1 | 1/2002 | Munson |
| 6,623,659 B2 | 9/2003 | Munson |
| 8,741,246 B2 * | 6/2014 | Bara .................... B01D 53/507 252/189 |

(Continued)

FOREIGN PATENT DOCUMENTS

| | | |
|---|---|---|
| CN | 113101782 B | 3/2023 |
| WO | 2022024937 A1 | 2/2022 |

OTHER PUBLICATIONS

Dongben Zhao, et al., "Nitrile-Functionalized Pyridinium Ionic Liquids: Synthesis, Characterization, and Their Application in Carbon—Carbon Coupling Reactions," Journal of the American Chemical Society, vol. 126, Issue 48, 2004, pp. 15876-15882.

(Continued)

*Primary Examiner* — Tam M Nguyen
(74) *Attorney, Agent, or Firm* — Merchant & Gould P.C.

(57) ABSTRACT

Metal-containing ionic liquids can demonstrate a sharply increased viscosity relative to the same ionic liquids without the metal cation. Metal-containing ionic liquid compositions are disclosed that contain viscosity modifiers that reduce viscosity. Metal-containing ionic liquids are applicable to methods and within systems designed for the purpose of removing and recovering certain components of process streams such as ethylene, isobutane, or both. Methods for removing and recovering ethylene from process streams are also disclosed herein as having increased ethylene removal capacity concurrently with reductions in viscosity without corresponding reductions in metal cation concentrations.

25 Claims, 2 Drawing Sheets

(56) References Cited

U.S. PATENT DOCUMENTS

| | | |
|---|---|---|
| 9,732,016 B2 | 8/2017 | Ji |
| 10,227,274 B2 | 3/2019 | Ji |
| 2002/0063240 A1 | 5/2002 | Munson |
| 2006/0287521 A1 | 12/2006 | Davis, Jr. |
| 2012/0232232 A1 | 9/2012 | Hottovy |
| 2014/0319419 A1* | 10/2014 | Broderick .......... B01D 53/1475 |
| | | 252/190 |
| 2015/0030524 A1 | 1/2015 | Ji |
| 2015/0133711 A1 | 5/2015 | Ji |
| 2021/0167424 A1 | 6/2021 | Evans |
| 2022/0274944 A1* | 9/2022 | Cheng .................... B01D 53/14 |
| 2022/0339579 A1* | 10/2022 | Voskian ............... B01D 53/326 |

OTHER PUBLICATIONS

IUPAC Compendium of Chemical Terminology, 2nd Ed. 1997, pp. 1-1670.

International Search Report and Written Opinion issued in correspondir Application No. PCT/US2023/067735, mailed on Oct. 16, 2023. 10 pp.

Marion Stricker et al., "Copper(I) and Silver(I) Bis(trifluoromethanesulfonyl)imide and Their Interaction with an Arene, Diverse Olefins, and an NTf2-Based Ionic Liquid," CHEMISTRY—A European Journal, John Wiley & Sons, Inc, DE, vol. 19, No. 3, Nov. 23, 2012 (Nov. 23, 2012), pp. 1042-1067, XP071838262, ISSN: 0947-6539, DOI: 10.1002/CHEM.201201740, compound 9, p. 1043, p. 1050-p. 1053, table 2.

\* cited by examiner

METAL-CONTAINING IONIC LIQUIDS WITH REDUCED VISCOSITY

FIELD OF THE INVENTION

The present disclosure generally relates to metal-containing ionic liquids having a reduced viscosity, methods for removing and recovering ethylene from a process stream using the metal-containing ionic liquids, complexes for preparing the ionic liquids, and related product processing systems for using the ionic liquids to recover ethylene from process streams.

BACKGROUND OF THE INVENTION

Metal-containing ionic liquids have found utility for the capture and recovery of certain compounds from process streams. For instance, systems have been developed to contact metal-containing ionic liquids with process streams to capture ethylene through π-bonding interactions with the metal-containing ionic liquids. Typically, higher metal concentration correlates with an increased capacity of the ionic liquid to sequester ethylene from the process stream, e.g., an increased carrying capacity. However, increasing metal cation concentration also can sharply increase the viscosity of the metal-containing ionic liquid relative to the ionic liquid that does not contain the metal.

Increased viscosity can be detrimental. Generally, the efficiency of contact between the process stream and the ionic liquid and the ability to transport the ionic liquid throughout recovery systems often can be inversely proportional to the viscosity of the metal-containing ionic liquid. Therefore, ionic liquid compositions having higher viscosity can be more difficult or even impossible to implement within ethylene recovery systems, as compared to less viscous ionic liquid compositions.

Accordingly, the present disclosure is generally directed to metal-containing ionic liquid compositions that have a viscosity that is acceptable for use within ethylene recovery systems.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Aspects of this invention are directed to compositions comprising (i) an ionic liquid comprising an ionic liquid cation and an ionic liquid anion, (ii) a metal cation, and (iii) a viscosity modifier. For instance, the ionic liquid can be N,N-allylmethylimidazolium bis(trifluoromethanesulfonyl)imide or (1-(2-cyanoethyl))-3-methylimidazolium bis(trifluoromethanesulfonyl)imide, the metal cation can be a copper cation or a silver cation, and the viscosity modifier can be 3,4-dichlorotoluene, sulfolane, N-methylpyrrolidinone, caprolactone, propylene carbonate, benzylbutylphthalate, or any combination thereof.

In accordance with another aspect of this invention, a method for reducing the viscosity of a metal-containing ionic liquid can comprises combining the metal-containing ionic liquid with a viscosity modifier to form a composition having a viscosity that is less than or equal to 80% of the metal-containing ionic liquid. Methods may also comprise selecting the viscosity modifier according to its boiling point, dipole moment, Hansen solubility properties, or any combination thereof.

In accordance with another aspect of this invention, a method for separating ethylene from a process stream is disclosed, and this method can comprise (i) contacting the process stream comprising ethylene and a metal-containing ionic liquid to form an ethylene-rich metal-containing ionic liquid comprising ethylene captured from the process stream, (ii) separating the ethylene-rich metal-containing ionic liquid from the process stream, and (iii) releasing ethylene from the ethylene-rich metal-containing ionic liquid to form an ethylene-poor metal-containing ionic liquid. The method can result in an overall ethylene recovery capacity sufficient to remove 1 mol of ethylene from the process stream per L of the metal-containing ionic liquid contacted with the process stream.

A novel copper complex, Cu(I) bis(trifluoromethanesulfonyl)imide), is also disclosed herein.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls. Unless otherwise stated, Hansen solubility characteristics for compounds recited herein are taken from values listed in "Hansen Solubility Parameters: A User's Handbook" by Charles M. Hansen, CRC Press, 2007.

Herein, features of the subject matter are described such that, within particular aspects, a combination of different features can be envisioned. For each and every aspect and each and every feature disclosed herein, all combinations that do not detrimentally affect the processes or methods described herein are contemplated with or without explicit description of the particular combination. Additionally, unless explicitly recited otherwise, any aspect or feature disclosed herein can be combined to describe inventive compositions or methods consistent with the present disclosure.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The terms "contacting" and "combining" are used herein to describe compositions and methods in which the materials or components are contacted or combined together in any order, in any manner, and for any length of time, unless otherwise specified. For example, the materials or components can be blended, mixed, slurried, dissolved, reacted, treated, impregnated, compounded, or otherwise contacted or combined in some other manner or by any suitable method or technique.

In this disclosure, while compositions and methods are described in terms of "comprising" various components or steps, the compositions and methods also can "consist essentially of" or "consist of" the various components or steps, unless stated otherwise. The terms "a," "an," and "the" are intended to include plural alternatives, e.g., at least one, unless otherwise specified.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, ionic liquid compositions disclosed herein can comprise a viscosity. By a disclosure that a weight percentage of the viscosity modifier in the ionic liquid can be in a range from 3 wt. % to 25 wt. %, the intent is to recite that the weight percentage can be any amount within the range and, for example, can include any range or combination of ranges from 3 wt. % to 25 wt. %, such as from 5 wt. % to 10 wt. %, from 3 wt. % to 20 wt. %, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

The term "ionic liquid" (or "IL") as used herein is given its ordinary meaning in the art, and means liquids, more particularly molten salts, that contain substantially only ions, and more particularly only anions and cations, having a melting point of 200° C. or less, and having a high thermal stability and a low flammability. Room Temperature Ionic Liquids (RTILs) are ionic liquids that are liquid at standard temperature and pressure, preferably below 100° C. In certain embodiments, the ionic liquid may be represented by the empirical formula $A_xQy$, where A is a monoanion or polyanion, Q is a monocation or polycation, x is a number ranging from 1 to about 4, and y is a number ranging from 1 to about 4. The cations associated with ILs are structurally diverse, but generally contain one or more nitrogens as part of a ring structure and are capable of being converted to quaternary amines. Examples of such cations include pyridinium, pyridazinium, pyrimidinium, pyrazinium, imidazolium, pyrazolium, oxazolium, triazolium, thiazolium, piperidinium, pyrrolidinium, quinolinium, and isoquinolinium. Anions bound to ILs can also be structurally diverse and varied and can have a significant impact on the solubility of ILs in different media. For example, containing hydrophobic anions such as hexafluorophosphate or trifluoromethanesulfonimides have very low solubility in water, whereas ILs containing hydrophilic anions such as chloride or acetate are completely miscible in water. The name of ionic liquids may generally be abbreviated. Alkyl cations are usually named by the alkyl substituent and the letter of the cation, which are given in a set of brackets, followed by the abbreviation of the anion. Although not expressly written, it is understood that the cation has a positive charge and the anion has a negative charge. For example, [BMIm] OAc represents 1-butyl-3-methylimidazolium acetate, [AMIm] Cl represents 1-allyl-3-methylimidazolium chloride, and [EMIm] OF represents 1-ethyl-3-methylimidazolium formate.

The term ionic liquid "composition" is used herein to describe a composition comprising an ionic liquid as a majority component, and therefore can be applied to compositions generally that contain more than 50 wt. % ion pairs and exist as a liquid under standard temperature and pressure. Ionic liquid compositions can therefore be understood to refer generally to compositions including but not limited to an ionic liquid, a metal-containing ionic liquid, an ethylene-rich metal-containing ionic liquid, an ethylene-poor metal-containing ionic liquid, and a metal-containing ionic liquid comprising a viscosity modifier.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

The present invention is generally directed to reducing the viscosity of metal-containing ionic liquids and methods for capturing and recovering components of a process stream using metal-containing ionic liquids. Herein, ionic liquid compositions are disclosed having a significantly reduced viscosity by the addition or presence of a viscosity modifier compatible with an ionic liquid. Viscosity of the resulting ionic liquid compositions can be reduced to less than 200 cP at 40° C. in certain aspects, and in certain aspects to less than 50% or more of the viscosity of analogous ionic liquid compositions without the viscosity modifier.

Generally, addition of metal cations to ionic liquid compositions can be accompanied by a sharp increase in viscosity. For example, the viscosity of ionic liquids can increased roughly 10-fold after loading metal cations at concentrations from 1 M to 2 M. As the metal cation is believed to be responsible for reversibly retaining ethylene on contact with the process stream, it is desirable to maximize the metal cation concentration. Viscosity modifiers disclosed herein are beneficial components in a metal-containing ionic liquid formulation, often reducing the viscosity more than 50% with only a minor dilution of the metal cation concentration (e.g., 3-5%).

Metal-Containing Ionic Liquid Compositions

Ionic liquid compositions are contemplated herein, particularly for the removal of certain components from process streams as described throughout this disclosure. Generally, ionic liquid compositions can comprise an anion and cation constituting an ionic liquid, a metal cation, and a viscosity modifier. In certain aspects, the ionic liquid can comprise a majority of the ionic liquid composition, and constitute at least 50 wt. %, at least 60 wt. %, at least 75 wt. %, at least 90 wt. %, or at least 95 wt. % of the ionic liquid composition. Ionic liquids contemplated herein can serve as the solvent, carrier or stock solution for the addition and support of metal cations complexed or otherwise dispersed within the ionic liquid composition.

In certain aspects, the metal cation can be provided and present within the ionic liquid composition as a metal salt comprising the metal cation and a metal anion. On loading the metal cation into the ionic liquid, the ionic liquid cation may exchange with the metal cation, thereby forming a metal complex between the ionic liquid anion and the metal cation. Advantageously, the metal cation can be provided as a salt or complex of the metal cation and an anion identical to the ionic liquid anion. In such aspects, the addition of metal cation and formation of the desired metal complex can be conducted independently of the preparation of the ionic liquid composition. For instance, Cu(I) bis(trifluoromethanesulfonyl)imide is identified and disclosed herein as a particular example of such a metal complex suitable for ionic liquid compositions.

In certain aspects, the ionic liquid cation can comprise an allylmethylimidazolium, a butylethylimidazolium, a butylmethylimidazolium, butyldimethylimidazolium, a decaethylimidazolium, a decamethylimidazolium, a diethylimidazolium, a dimethylimidazolium, an ethyl-2,4-dimethylimidazolium, an ethyldimethylimidazolium, an ethylimidazolium, an ethylmethylimidazolium, an ethylpropylimidazolium, an ethoxyethylmethylimidazolium, an ethoxydimethylimidazolium, a hexadecylmethylimidazolium, a heptylmethylimidazolium, a hexylethylimidazolium, a hexylimidazolium, a hexyldimethylimidazolium, a methoxyethylmethylimidazolium, a methoxypropylmethylimidazolium, a methylimidazolium, a dimethylimidazolium, a methylnonylimidazolium, a methylnonylimidazolium, an octadecylmethylimidazolium, a hydroxylethylmethylimidazolium, a hydroxyloctylmethylimidazolium, a hydroxylpropylmethylimidazolium, an octylmethylimidazolium, an octyldimethylimidazolium, a phenylethylmethylimidazolium, a phenylmethylimidazolium, a phenyldimethylimidazolium, a pentylmethylimidazolium, a propylmethylimidazolium, 1-butyl-2-methylpyridinium, 1-butyl-3-methylpyridinium, a butylmethylpyridinium, 1-butyl-4-dimethylacetylpyridinium, 1-butyl-4-methylpyridinium, 1-ethyl-2-methylpyridinium, 1-ethyl-3-methylpyridinium, 1-ethyl-4-dimethylacetylpyridinium, 1-ethyl-4-methylpyridinium, a 1-hexyl-4-dimethylacetylpyridinium, a 1-hexyl-4-methylpyridinium, a 1-octyl-3-methylpyridinium, a 1-octyl-4-methylpyridinium, a 1-propyl-3-methylpyridinium, a 1-propyl-4-methylpyridinium, a butylpyridinium, an ethylpyridinium, a heptylpyridinium, a hexylpyridinium, a hydroxypropylpyridinium, an octylpyridinium, a pentylpyridinium, a propylpyridinium, a butylmethylpyrrolidinium, a butylpyrrolidinium, a hexylmethylpyrrolidinium, a hexylpyrrolidinium, an octylmethylpyrrolidinium, an octylpyrrolidinium, a propylmethylpyrrolidinium, a butylammonium, a tributylammonium, a tetrabutylammonium, a butylethyldimethylammonium, a butyltrimethylammonium, N,N,N-trimethylethanolammonium, ethylammonium, diethylammonium, tetraethylammonium, a tetraheptylammonium, a tetrahexylammonium, methylammonium, dimethylammonium, tetramethylammonium, ammonium, a butyldimethyl ethanolammonium, dimethylethanolammonium, ethanolammonium, ethyldimethylethanolammonium, a tetrapentylammonium, a tetrapropylammonium, a tetrabutylphosphonium, a tributyloctylphosphonium, or combinations thereof.

As noted above, the ionic liquid anion can be selected for its compatibility with the metal cation in forming a complex with some capacity to retain ethylene through intermolecular interactions. In certain aspects, ionic liquid anion can comprise bis(trifluoromethanesulfonyl)imide, bis(fluorosulfonyl)imide, a hexafluorophosphate anion, a trifluoromethanesulfonate anion, a dicyanamide anion, a tetrafluoroborate anion, a thiocyanate anion, a nitrate anion, a sulfonate anion, a methylsulfate anion, a methanesulfonate anion, a trifluoroacetate anion, an acetate anion, or combinations thereof.

The ionic liquid compositions as disclosed above may further contain a metal cation, and be applied to the removal of ethylene (among other compounds) from process streams. Metal cations suitable for the ionic liquid compositions are not limited to any particular metal, or cation, and generally can be any that are miscible with ionic liquids disclosed herein, and available to reversibly retain a desired compound (e.g., ethylene, isobutane) within a metal-containing ionic liquid composition. Suitable metal cations can include, but are not limited to copper cations, silver cations, and gold cations, and more specifically Cu(I), Ag(I), and Au(I). Other transition metal cations, heavy metal cations (including but not limited to platinum cations, palladium cations, iridium cations, and rhenium cations) alkali earth metal cations, alkaline metal cations also may be considered suitable for the purpose of binding compounds through π-interactions between a given compound and the metal cation.

In certain aspects, the ionic liquid compositions disclosed herein can be characterized by an ethylene capacity (e.g., ethylene solubility) at 0.10 MPa ethylene and standard temperature and pressure of at least 1 mol/L, at least 1.1 mol/L, at least 1.2 mol/L at least 1.5 mol/L, at least 2 mol/L, at least 3 mol/L or at least 5 mol/L.

In certain aspects, the ethylene capacity of the metal-containing ionic liquid composition can be driven by the amount of metal cation in the composition and the efficiency and strength of binding interactions between the metal cation and ethylene. As disclosed herein, the amount of metal cation available to be added to the ionic liquid can be practically limited by the sharp increase in viscosity observed, particularly where metal cation concentrations exceed 0.5 M, 1.0 M, 1.5 M, 2 M, 2.5 M, or 3 M. In certain aspects, the ionic liquid compositions can have a metal cation concentration of at least 0.5 M, at least M, at least 1.0 M, at least 1.5 M, at least 2 M, or at least 2.5 M. For instance, suitable ionic liquid compositions can have a metal cation concentration in a range from 0.5 to 2.5 M, from 0.75 M to 2.0 M, or from 1.0 M to 2.0 M.

Viscosity modifiers can dilute the metal-containing ionic liquids, and specifically the metal cation concentration within the ionic liquid. Thus, ionic liquid compositions disclosed herein may demonstrate a reduced ethylene solubility (e.g., ethylene capacity) relative to metal-containing ionic liquids without the viscosity modifier. Metal-containing ionic liquid compositions containing a relatively small amount of viscosity modifier can be advantageous by limiting the dilution effect. In certain aspects, ionic liquid compositions disclosed herein can have an ethylene solubility (e.g., ethylene capacity) of at least 75%, at least 80%, at least 85%, at least 90%, at least 95%, or at least 98% of an otherwise identical composition without the viscosity modifier.

Metal cations and complexes thereof within the metal-containing ionic liquid can be impart a desired selectivity to capture and recover a particular compound from the process stream in the methods disclosed herein. In certain aspects, the metal cation within the ionic liquid compositions can demonstrate affinity to retain ethylene, or isobutane, in a selective manner relative to other compounds that may be commonly present in a given process stream. For instance, metal-containing ionic liquid compositions disclosed herein can have (or can be characterized by) a molar selectivity for retaining ethylene relative to ethane in a range from 10:1 to 500:1, from 15:1 to 200:1, from 25:1 to 150:1, or from 100:1 to 200:1.

Ionic liquid compositions disclosed herein for the purpose of reversibly retaining ethylene, therefore, may further contain ethylene. In certain aspects, the metal-containing ionic liquid compositions can comprise from 0.1 wt. % to 5 wt. % ethylene, from 0.1 wt. % to 3 wt. % ethylene, from 0.5 wt. % to 5 wt. % ethylene, from 0.5 wt. % to 3 wt. % ethylene, or from 1 wt. % to 3 wt. % ethylene, although not limited thereto.

Viscosity Modifiers

As discussed above, viscosity modifiers contemplated herein can be any that are suitable for reducing the viscosity of metal-containing ionic liquids without unacceptably diluting the ethylene capacity of the metal-containing ionic liquid. Viscosity modifiers disclosed herein can therefore significantly mitigate an increase in viscosity that often accompanies increased metal cation concentrations in ionic liquid formulations. Surprisingly, the ability to reduce viscosity of the ionic liquid composition is not directly dependent on the viscosity of the viscosity modifier itself. Compounds that demonstrate a viscosity reduction only equivalent to the algebraic expectation based on the amount of viscosity modifier relative to the viscosity of the ionic liquid composition may provide limited value to modify the viscosity of metal-containing ionic liquids, at least because the reduction in viscosity is such aspects may be commensurate with a reduction in the overall concentration of the metal cation and the overall effectiveness of the metal-containing ionic liquid to capture ethylene.

In contrast, viscosity modifiers contemplated herein may drastically exceed the algebraic expectation of viscosity reduction for metal-containing ionic liquids. In certain aspects, suitable viscosity modifiers can be any compound resulting in the composition having a viscosity less than or equal to 90%, less than or equal to 80%, less than or equal to 70%, less than or equal to 60%, less than or equal to 50%, or less than or equal to 35% of the original viscosity of the ionic liquid composition. Significantly, viscosity modifiers contemplated herein can achieve such reduction in viscosity even where the amount of the viscosity modifier represents less than or equal to 25 wt. %, less than or equal to 20 wt. %, less than or equal to 15 wt. %, less than or equal to 10 wt. %, less than or equal to 5 wt. % or less than or equal to 3 wt. % of the ionic liquid composition under the same conditions. As shown throughout the examples below, it will be understood that in certain aspects, the viscosity of an ionic liquid composition can be reduced to less than or equal to 50% by the addition of less than or equal to 10 wt. %, less than or equal to 5 wt. %, or less than or equal to 3 wt. % of certain viscosity modifiers.

In some aspects, the ionic liquid compositions—that contain viscosity modifiers—can have a viscosity at 40° C. of less than or equal to 1000 cP, less than or equal to 500 cP, less than or equal to 250 cP, less than or equal to 200 cP, or less than or equal to 100 cP. Further, relative to the starting viscosity of the ionic liquid composition as noted above, there can be a viscosity reduction of at least 50%. Again, this reduction in viscosity may be achieved with relatively small amounts of the viscosity modifier so as not to dilute the metal cation concentration (and therefore, not negatively impact the ethylene solubility or ethylene capacity) of the ionic liquid composition.

Suitable viscosity modifiers are identified throughout the examples below, and as shown, can include 3,4-dichlorotoluene, sulfolane, N-methylpyrrolidinone, caprolactone, propylene carbonate, benzylbutylphthalate, and the like, or any combination thereof. Structurally similar halongenated aromatics and small molecule heterocyclic compounds, and generally having a molecular weight less than 400 Da, are also contemplated as viscosity modifiers and in certain aspects may include 1-bromo-2-chloro-4-methylbenzene, 4-bromo-1,2-dichlorobenzene, 4-chlorotoluene, 3-chlorotoluene, trimethylene sulfone, 1-butane sultone, 1-propanesultone, butadienesulfone, 2-methylsulfolane, 3-methylsulfolane, 2,4-dimethylsulfolane, 1,3-dihydrobenzothiophene 2,2-dioxide, gamma-butyrolactone, cyclohexanone, cycloheptanone, cyclopentatone, 1,3-dioxan-2-one, 1,3-cycloheptanedione, 1,4-dioxan-2-one, tetrahydro-4H-pyran-4-one, caprolactam, ethylene carbonate, and 1,3-oxazinan-2-one.

Viscosity modifiers contemplated herein also may be characterized by physical characteristics, as shown in Table 1 below. Compounds with relatively high dipoles may be advantageous to assist miscibility with the metal-containing ionic liquid. In certain aspects, the viscosity modifier can have a dipole moment in a range from 2 D to 6 D, from 2.5 D to 5 D, from 3 to 5 D, or at least 2.5 D, at least 3 D, at least 3.5 D, at least 4 D, or at least 5 D. Viscosity modifiers having certain ranges of Hansen solubility parameters have also been identified as advantageous for use in reducing viscosity of the metal-containing ionic liquid compositions disclosed herein. In certain aspects, viscosity modifiers can have a Hansen solubility hydrogen-bonding parameter in a range from 2 to 11, a Hansen solubility dispersion parameter in a range from 17 to 21, a Hansen solubility polarity parameter in a range from 9 to 19, or any combination thereof.

Physical characteristics such as particular boiling point and melting point ranges also may be beneficial for the suitability of the viscosity modifier. In certain aspects, viscosity modifiers can have a boiling point at standard temperature and pressure of at least 125° C., at least 150° C., at least 200° C., or at least 250° C. The melting point of viscosity modifier also may be sufficiently low to ensure that the resulting ionic liquid composition remains liquid across a broad range of conditions, and in certain aspects, less than or equal to 0° C., less than or equal to −20° C., or less than or equal to −50° C.

TABLE 1

Physical properties of viscosity modifiers

| Viscosity modifier | Boiling Point (° C.) | Dipole moment | Viscosity at 25° C. (cP) | Hansen dispersion | Hansen polarity | Hansen h-bonding |
|---|---|---|---|---|---|---|
| acetonitrile | 82 | 3.9 | 0.34 | 15.3 | 18.0 | 6.1 |
| sulfolane | 285 | 4.7 | 10.07 | 20.3 | 18.2 | 10.9 |
| propylene carbonate | 242 | 4.9 | 2.5 | 20.0 | 18.0 | 4.1 |
| NMP | 203 | 4.1 | 1.89 | 18.0 | 12.3 | 7.2 |
| 3,4-dichlorotoluene | 201 | 2.7 | — | 19.8 | 9.8 | 2.5 |
| caprolactone | 241 | 3.9 | — | 19.7 | 15.0 | 7.4 |
| benzylbutylphthalate | 370 | 2.8 | 42 | 19.0 | 11.2 | 3.1 |

Methods for Reducing Viscosity of Metal-Containing Ionic Liquids, Related Systems and Separation Methods Methods of reducing the viscosity of an ionic liquid are disclosed herein, for instance to reduce the viscosity of the ionic liquid to less than or equal to 95%, less than or equal to 90%, less than or equal to 85%, less than or equal to 80%, less than or equal to 75%, or less than or equal to 60% of the original ionic liquid. In certain aspects, such methods can be applied to any ionic liquid compositions or metal-containing ionic liquids disclosed herein.

As can be seen from the Examples of viscosity modifiers below, methods of modifying the viscosity of an ionic liquid may not be simply achieved by the addition of any miscible compound having relatively low viscosity itself. Methods of reducing the viscosity of an ionic liquid, or a metal-containing ionic liquid as disclosed herein therefore can comprise selecting a viscosity modifier based at least in part on any combination of several parameters related to polarity and solubility, such as the dipole moment, Hansen solubility dispersion parameter, Hansen solubility hydrogen-bonding parameter, and Hansen solubility polarity parameter. It will also be understood by those of skill in the art that the selection of viscosity modifier may be further limited by practical considerations (e.g., boiling point) relevant to a particularly intended application of the composition.

As particularly relevant to the present disclosure, metal-containing ionic liquids having a reduced viscosity may be beneficially used for the capture and recovery of one or more olefins (e.g., ethylene), acid gases, or any other compound showing a reversible binding affinity to the metal-containing ionic liquid, from a process stream comprising the same. For instance, in certain aspects, ethylene can be removed from a process stream comprising ethylene to form an ethylene-rich metal-containing ionic liquid. Similarly, isobutane can be removed from a process stream comprising isobutane to form an isobutane-rich metal-containing ionic liquid. In certain aspects, the process stream can comprise ethylene and/or isobutane, each of which can be removed from the process stream by the metal-containing ionic liquid. In certain aspects, selection of the viscosity modifier can be conducted as identifying a compound having a boiling point of at least 150° C., a dipole moment of at least 2.5 D, a Hansen solubility hydrogen-bonding parameter in a range from 2 to 11, a Hansen solubility dispersion parameter in a range from 17 to 21, a Hansen solubility polarity parameter in a range from 9 to 19, or any combination thereof.

Methods of reducing the viscosity of the ionic liquid compositions can comprise contacting a selected viscosity modifier (e.g., any suitable viscosity modifier disclosed herein) and the ionic liquid composition (e.g., any metal-containing ionic liquid disclosed herein).

Metal-containing ionic liquids having a reduced viscosity generally can be advantageously used for recovery of certain gaseous components of process streams, such as those described in U.S. Pat. Nos. 10,227,274 and 9,732,016. For instance, U.S. Pat. No. 10,227,274 provides examples of process streams where it may be advantageous to separate gaseous components from liquid components of a process stream, including but not limited to, polymerization process streams comprising olefins and alkanes; ethane cracker process streams comprising ethane and ethylene; natural gas process streams comprising natural gas and an acid gas; syngas process streams comprising syngas and carbon dioxide; biomass gasification process streams comprising carbon dioxide; Fischer-Tropsch process streams comprising unreacted syngas, methane, olefins, and alkanes; alkane dehydrogenation process streams comprising olefins and alkanes; and alcohol dehydration process streams comprising olefins, alkanes, and alcohols.

In certain aspects, the process stream can comprise an amount of ethylene in range from 3 to 70 wt. %, from 5 to 50 wt. %, from 10 to 40 wt. %, from 10 to 25 wt. %, although not limited thereto. Additionally or alternatively, the amount of ethylene in gaseous process streams can be characterized by the ethylene partial pressure, and in certain aspects the ethylene partial pressure in the process stream can be in a range from 10 psia to 500 psia, from 30 psia to 250 psia, or from 20 psia to 200 psia. Methods for separating ethylene from a process stream using a reduced viscosity ionic liquid composition are disclosed herein and can comprise contacting a process stream comprising ethylene and a metal-containing ionic liquid to form an ethylene-rich metal-containing ionic liquid comprising ethylene captured from the process stream. The amount of ethylene captured from the process stream by the metal-containing ionic liquid during the contacting step can be impacted by the duration and efficiency of the contacting step, the amount of ethylene in the process stream, and the ethylene solubility in the metal-containing ionic liquid.

Generally, contacting the process stream with the metal-containing ionic liquid can be performed in any manner that allows sufficient interaction between the stream, allowing the ionic liquid to capture ethylene from the process stream. In certain aspects, contacting the process stream with the metal-containing ionic liquid can capture or remove at least 60 wt. %, at least 70 wt. %, at least 75 wt. %, 80 wt. %, at least 90 wt. %, at least 95 wt. %, or at least 99 wt. % of the ethylene from the process stream. Multiple contacting steps can be applied to further recover ethylene not captured during a single pass.

In certain aspects, the process stream can be a gaseous process stream. In such aspects, the ionic liquid can be applied in a counter current direction to the process stream to increase efficiency of the contacting between the process stream and the ionic liquid, and incorporate separators that conduct liquid-gas separations as part of the contacting step. In other aspects, the flow rate may be increased to improve efficiency of the contacting step. Increases in the ionic liquid flow rate may be limited by a viscosity at or above 200 cP, 400 cP, or 1000 cP. At least in part due to the reduced viscosity of compositions disclosed herein, the ionic liquid can be transported (and contacted with the process stream) using a flow rate in a range from 1,000 pounds per hour to 300,000 pounds per hour, from 3,000 pounds per hour to 150,000 pounds per hour, or from 5,000 pounds per hour to 100,000 pounds per hour. In certain aspects, the process stream flow rate can be in a range from 10 pounds per hour to 5,000 pounds per hour, or from 100 pounds per hour to 3,000 pounds per hour. Thus, in certain aspects a mass flow ratio of the metal-containing ionic liquid flow rate to the process stream flow rate can be in a range from 1 to 500, from 10 to 300, from 25 to 250, from 10 to 100, or from 10 to 50. Given that the mass flow ratio can heavily favor the metal-containing ionic liquid, the limiting factor to scaling the methods to separate ethylene from the process stream as disclosed herein can be the flow rate of the metal-containing ionic liquid, which in turn can be limited by the viscosity of the metal-containing ionic liquid. Surprisingly, the compositions described herein have provide significant reductions in viscosity with only a minimal reduction in the metal cation concentration.

Methods for removing ethylene from a process stream may also comprise separating the ethylene-rich metal-containing ionic liquid from the process stream, and generally can be performed by allowing the uncaptured portion of the process stream to proceed out of the separator separately from the ethylene-rich metal-containing ionic liquid. Once separated from the process stream, the ethylene-rich metal-containing ionic liquid can be subjected to conditions to cause the captured ethylene to be released to form ethylene and an ethylene-poor metal-containing ionic liquid. The ethylene-poor metal-containing ionic liquid can be considered as being a regenerated form of the metal-containing ionic liquid, and suitable to be returned (or recycled) to the separator to capture another amount of ethylene from the process stream in a continuous process.

Conditions for the contacting step and the releasing step are not limited to any particular set of conditions other than those appropriate for the capture and release of ethylene from the metal-containing ionic liquid and without interfering with the purity or quality of the process stream. In certain aspects, contacting the process stream and the metal-containing ionic liquid can be conducted at a contact temperature in a range from −10° C. to 100° C., from 5° C. to 50° C., or from 20° C. to 40° C. The process stream and the metal-containing ionic liquid can be contacted at a contact pressure in a range from 50 psia to 500 psia, or from 100 psia to 250 psia. The disclosed methods are limited solely to these particular temperature and pressure ranges.

Methods for separating ethylene from the process stream therefore can further comprise releasing ethylene from the ethylene-rich metal-containing ionic liquid to form an ethylene-poor metal-containing ionic liquid and ethylene, and physically separating the ethylene from the ethylene-poor metal-containing ionic liquid. In certain aspects, this can be achieved by allowing the ethylene to exit the regenerator as a gas from an outlet at an upper portion of the regenerator, while the ethylene-poor metal-containing ionic liquid (e.g., the regenerated metal-containing ionic liquid) is drawn from the regenerator from an outlet at a lower portion of the regenerator.

Similar to the contacting step, the releasing of ethylene can be performed at conditions suitable to affect the release of ethylene and are not particularly limited. In certain aspects, releasing ethylene from the ethylene-rich metal-containing ionic liquid can comprise a releasing temperature (e.g., recovery temperature) in a range from 50° C. to 500° C., from 60° C. to 450° C., from 100° C. to 300° C. or from 100° C. to 200° C. In certain aspects, releasing ethylene from the ethylene-rich metal-containing ionic liquid can be conducted at a releasing pressure (e.g., a recovery pressure) in a range from 5 psia to 50 psia or from 10 to 25 psia. In certain aspects, releasing ethylene from the ethylene-rich metal-containing ionic liquid comprises releasing at least 90 wt. %, at least 95 wt. %, at least 98 wt. %, or at least 99 wt. % of the captured ethylene from the ethylene-rich metal-containing ionic liquid.

Methods disclosed herein can further comprise recovering the released ethylene. In certain aspects, the ethylene released from the ethylene-rich metal-containing ionic liquid can be recovered practically in its entirety, or alternatively, at least 90 wt. %, at least 95 wt. %, at least 98 wt. %, or at least 99 wt. % of the released ethylene. The released ethylene also may be recovered with a purity of at least 90 wt. %, at least 95 wt. %, at least 98 wt. %, or at least 99 wt. %.

Systems suitable to perform methods described above are not limited to any particular system, and generally can be any that are capable of transferring the ionic liquid and contacting the process stream with the ionic liquid, and maintaining appropriate conditions (e.g., temperature, pressure) during the separation processes. For instance, U.S. Pat. No. 10,227,274 describes systems comprising a separator and a regenerator, with the ionic liquid continually transported between the separator and regenerator; such systems and device can used to conduct the methods described herein. Specifically, a system is disclosed for contacting the process stream and the metal-containing ionic liquid by flowing a gaseous process stream into a separator tank through a first inlet and to a first outlet positioned above the first inlet and flowing the metal-containing ionic liquid into the separator tank through a second inlet positioned above the first inlet, and to a second outlet positioned below the second inlet.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Metal-containing ionic liquids were prepared for examination of the viscosity in comparison to compositions containing the metal-containing ionic liquids and any of several potential viscosity modifying agents. Ionic liquids were prepared as detailed below. Viscosity (μ) measurements as disclosed herein were measured using an automatic rolling-ball viscosity meter (Anton-Paar (Graz, Austria), model Lovis 2000 M/Me), having a LOVIS 1.8 mm capillary tube and a steel ball of 1.5 mm diameter, with an instrumental stated measuring accuracy of 0.5%. The experimental data were measured within a temperature range of 20° C. to 60° C. with an increment of 5° C. or 10° C. for each sample as shown in the data tables below. A measuring angle of 70° was used for the viscosity measurements.

Ionic liquid A. 1-allyl-3-methylimidazolium bis((trifluoromethyl)sulfonyl)imide ([allylmim][NTf$_2$]).

1-Methylimidazole (16.0 g, 195 mmol) was dissolved in toluene (18 mL). 1-allylbromide (24.8 g, 205 mmol) was added to the solution and heated to 75° C. for 7 hrs. The solid was washed with ethyl acetate/hexanes and purified using acetonitrile and ethyl acetate to remove impurities to obtain 1-allyl-3-methylimidazolium bromide (36.8 g, 181 mmol) as a white solid (93% yield). 1-allyl-3-methyllimidazolium bromide (40.0 g, 197 mmol) was dissolved in water (100 mL) followed by the addition of lithium bis(trifluoromethylsulfonyl)imide (59.4 g, 207 mmol). This was stirred for 5 hr and extracted with dichloromethane (25 mL×3). 1-allyl-3-methyllimidazolium bis((trifluoromethylsulfonyl)imide (71.5 g, 177 mmol) was obtained as a clear viscous liquid (90% yield).

Ionic liquid B. [emimCN][NTf$_2$] was prepared according to the method of Dyson, et al., *Journal of the American Chemical Society* 2004, 126, 48, 15876-15882, incorporated by reference herein.

After obtaining the ionic liquid as described above, metal-containing ionic liquid compositions A and B were obtained by adding metal cation to the ionic liquid in the form of a metal salt, Cu(I) bis(trifluoromethanesulfonate)imidebis-acetonitrile. Acetonitrile was then removed by heating the metal salt under vacuum, as follows.

Synthesis of Cu$^I$(NTf$_2$)(MeCN)$_2$ Lithium bis(trifluoromethylsulfonyl)imide (1 eq) is suspended in sulfuric acid (7 eq) and heated to 80° C. for 12 hours. The reaction mixture is vacuumed distilled at 90° C. using a short column with the receiving flask immersed in a liquid nitrogen bath, to obtain bis(trifluoromethylsulfonyl)imide acid as a white solid (92% yield). Bis(trifluoromethylsulfonyl)imide acid is dissolved in water (2 eq), followed by the addition of copper(II) oxide (1 eq), and stirred overnight. The excess copper oxide was filtered and the solvent removed under vacuum at 40° C. to obtain copper (II) di-bis(trifluoromethylsulfonyl)imide [Cu$^{II}$(NTf$_2$)$_2$] as a blue solid in quantitative yield. The blue solid was dissolved in anhydrous acetonitrile (1 M solution) and stirred with 0.5 equivalent copper(0) powder for 1 day with the solution turning colorless. The solvent was removed under vacuum and handled under nitrogen to obtain the product as a white solid.

Synthesis of Metal-containing ionic liquid composition A (1.5M Cu$^I$(NTf$_2$)/[allylmim][NTf$_{2]}$): Cu$^I$(NTf$_2$)(MeCN)$_2$ (4.26 g) was dissolved in 10 g of Ionic Liquid A ([allylmim][NTf$_{2]}$), prepared as above. The resulting solution was stirred and heated at 140° C. under vacuum for 10 days resulting in a high viscosity orange fluid containing a nominal amount of residual acetonitrile as determined by $^1$H NMR. The solution retained a significant amount of acetonitrile after 5 days.

Synthesis of Metal-containing ionic liquid composition B (MCIL-B; 1.5 M Cu$^I$(NTf$_2$)/[emimCN][NTf$_{2]}$) and Metal-containing ionic liquid composition C (MCIL-C; Cu$^I$(NTf$_2$)/[emimCN][NTf$_{2]}$) were prepared as for MCIL-A above, by combining the appropriate metal salts and ionic liquids, in appropriate relative amounts.

Viscosity Reduction of Metal-Containing Ionic Liquids Comprising Viscosity Modifiers.

Compounds listed in Table 2 were evaluated as viscosity modifiers in metal-containing ionic liquids. Generally, metal-containing ionic liquids A-C (MCIL-A to MCIL-C) prepared as above were mixed with the compounds listed in Tables 2-4 in amounts from 5-15 wt. %, and the effect on viscosity was measured. First, the miscibility of each compound was assessed, and no further testing was conducted on samples that did not result in a completely dissolved solution. For instance, as shown with MCIL-A, neither 1,2,4,5-tetrachlorobenzene or elevated concentrations of 3,4-dichlorotoluene were miscible, as reported in Table 2 below.

The viscosity of certain ionic liquid compositions was also measured qualitatively, by orienting a sample of each composition horizontally and observing the horizontal displacement of the composition. Compositions having a larger horizontal displacement than the neat were noted as having a reduced viscosity. Compositions which demonstrated either of a significant horizontal displacement or an excellent miscibility were further examined quantitatively, and in higher concentrations of the viscosity modifier.

Figure 1:
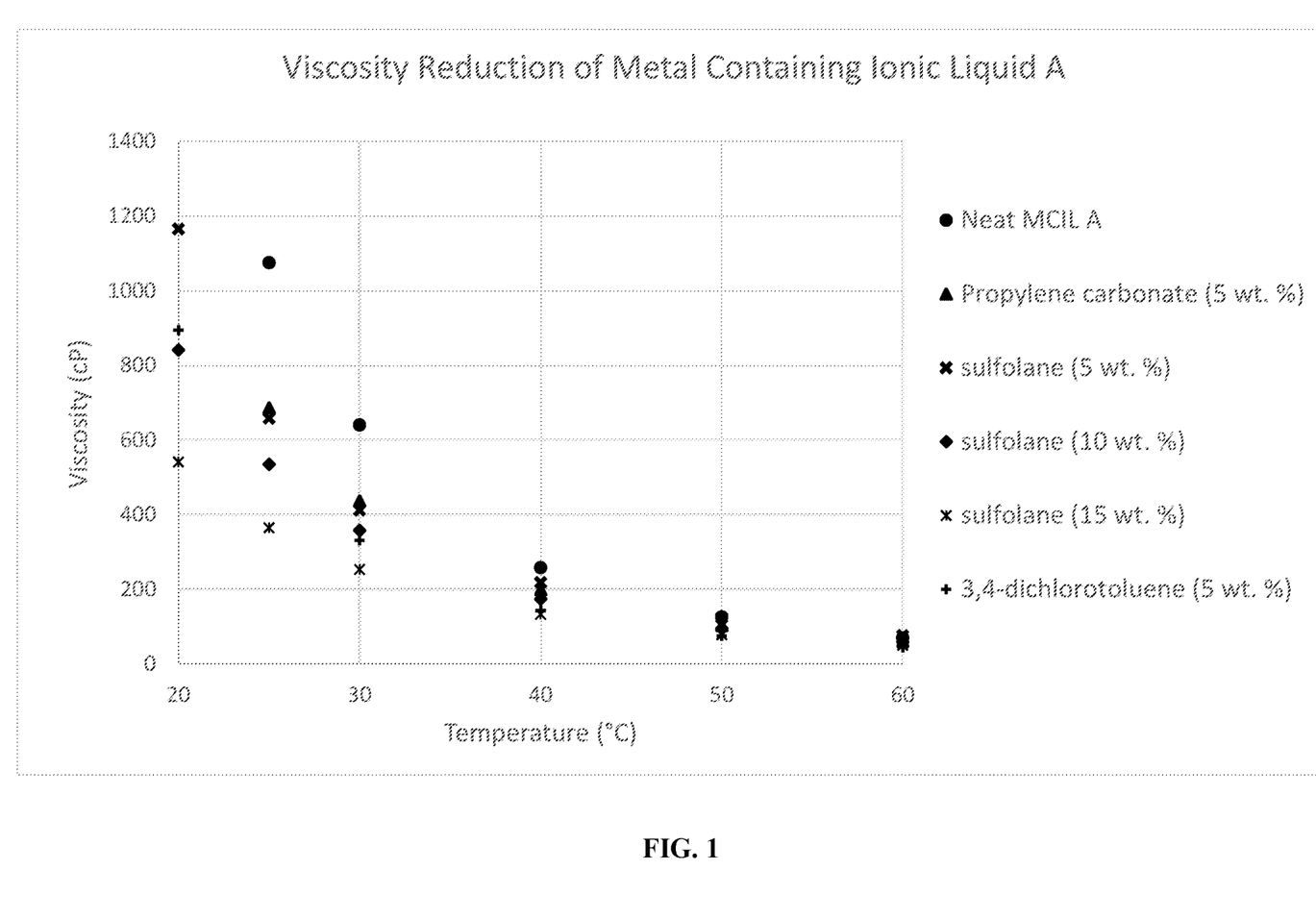
FIG. 1 presents a plot of viscosity as a function of temperature for certain metal-containing ionic liquid compositions of Table 2.

As shown in Table 2 below, the propylene carbonate, 3,4-dichlorotoluene, and sulfolane each demonstrated an exceptionally reduced viscosity at concentrations of only 5 wt. %, and particularly at temperatures between 20° C. and 40° C. For instance, 3,4-dichlorotoluene demonstrated a viscosity reduction of over 50% at 25° C. relative to neat MCIL-A, while representing only 5 wt. % of the ionic liquid composition. Sulfolane also showed significant reduction, but also excellent miscibility with the MCIL-A up to 15 wt. %. As shown by entry 4 of Table 2, the addition of sulfolane as a viscosity modifier to 15 wt. % of the ionic liquid composition reduced the viscosity more than 66% relative to neat MCIL-A at 25° C. These trends still hold significant reductions in viscosity even at higher temperatures, as demonstrated where the addition of sulfolane, 3,4-dichlorotoluene, or propylene carbonate reduced the viscosity at 40° C. of the resulting ionic liquid composition to less than 200 cP. FIG. 1 displays the data correlated to each entry in Table 2 where quantitative data is available.

Unexpected reductions in viscosity were also observed by addition of viscosity modifiers to MCIL-B and MCIL-C, as shown in Tables 3 and 4 respectively. While the viscosity @25° C. for neat MCIL-B was roughly ten-fold higher than that of MCIL-A, and viscosity modifiers also were generally less miscible in MCIL-B/C, addition of viscosity modifiers typically caused a significant reduction in the viscosity of each sample where the viscosity modifier was miscible, as compared to the neat MCIL (Comparative Examples 3-4). As seen by Examples 12 and 15, addition of 5 wt. % viscosity modifiers was again able to greatly reduce the viscosity of neat MCIL-B from about 34,000 cP to less than 10,000 in both examples (22% and 27% of the viscosity of MCIL-B, respectively). Example 13 (5 wt. % 3,4-dichlorotoluene) also showed a reduced viscosity relative to MCIL-B. While not as great a reduction as seen in Examples 12 and 15, addition of 3,4-dichlorotoluene still reduced the viscosity to 80% that of Comparative Example 3.

It is noted that the viscosity of MCIL-B was exceptionally high due to relatively high concentrations of the metal cation in the metal containing ionic liquid (1.5 M Cu). Without being bound by theory, it is believed that reducing the viscosity of metal-containing ionic liquids having a high viscosity, above a certain threshold value (e.g., 10,000 cP, 20,000 cP, cP, or 50,000 cP) may be exceptionally difficult. For instance, the viscosity of Example 14 containing 5 wt. % benzylbutylphthalate had practically no change (~3%) relative to the viscosity of neat MCIL-B.

Viscosity modifiers were also observed as added to MCIL-C, a metal-containing ionic liquid having a lower concentration of metal cation (0.75M) than MCIL-B (1.5M) and thus a lower viscosity. As shown by data for Examples 16 and 17 in Table 4 below, propylene carbonate and caprolactone each performed similarly to significantly reduce viscosity. However, 3,4-dichlorotoluene was not miscible in MCIL-C, unlike MCIL-B having the higher metal cation concentration. Surprisingly, benzylbutylphthalate also performed markedly different in MCIL-C, and caused a reduced viscosity comparable to Examples 16 and 17, in contrast to MCIL-B where benzylbutylphthalate had practically no effect on viscosity.

Effect of Viscosity Modifiers on Ethylene Solubility

Figure 2:
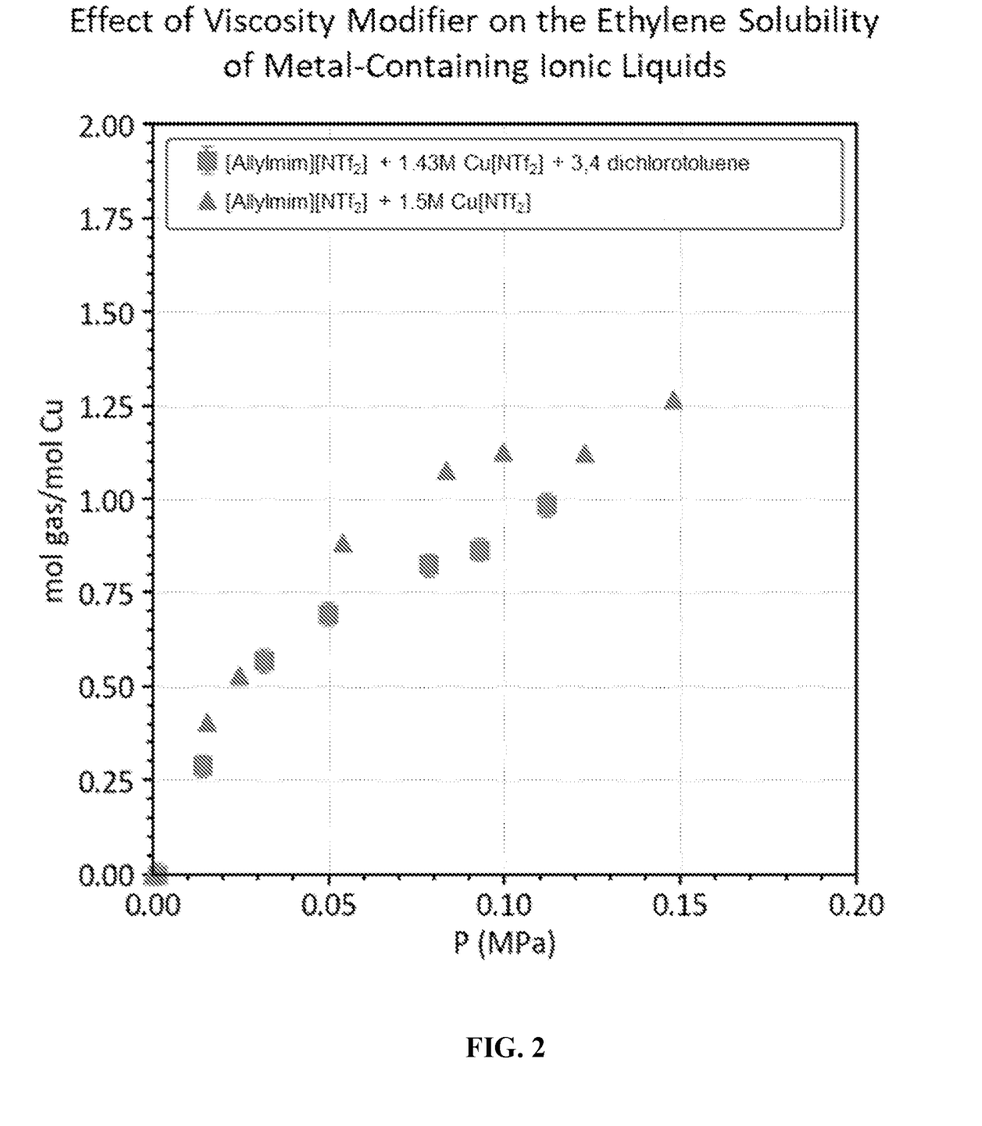
FIG. 2 presents a plot of ethylene solubility at various ethylene partial pressures for metal-containing ionic liquid A, with and without 5 wt. % added 3,4-dichlorotoluene, normalized with respect to Cu concentration.

Ethylene solubility of MCIL-A both with and without 5 wt. % added 3,4-dichlorotoluene was measured across several partial pressures of ethylene in the range from MPa ethylene, and results are shown graphically in FIG. 2. Addition of the 3,4-dichlorotoluene resulted in a drop in the metal concentration from 1.5M to 1.43M as shown in FIG. 2. After accounting for the drop in metal concentration, the ethylene solubility in each sample remained roughly comparable, with only a slight reduction of ethylene solubility observed for the sample containing 5 wt. % 3,4-dichlorotoluene. Thus, it was demonstrated that the mechanism by which metal-containing ionic liquids A and B derive their ability to reversibly capture ethylene is largely independent from the mechanism by which viscosity is reduced. Viscosity modifiers as disclosed herein therefore may be added to metal-containing ionic liquids without concern that the ethylene solubility of metal-containing ionic liquid will be significantly reduced.

TABLE 2

Viscosity (in cP) of Metal-Containing Ionic Liquid A and viscosity modifiers at various temperatures (in ° C.).

| Example | Ionic liquid/ Viscosity modifier | Wt. % | Visc. @ 20 | @ 25 | @ 30 | @ 40 | @ 50 | @ 60 |
|---|---|---|---|---|---|---|---|---|
| Comp. 1 | Neat Ionic Liquid A | N/A | 40 | 33 | 27 | 20 | 15 | 12 |
| Comp. 2 | Neat MCIL A | N/A | No data | 1075 | 640 | 258 | 126 | 70 |
| 1 | Propylene carbonate | 5 | No data | 686 | 437 | 199 | 103 | 61 |
| 2 | sulfolane | 5 | 1165 | 658 | 412 | 218 | 124 | 76 |
| 3 | sulfolane | 10 | 841 | 535 | 358 | 174 | 95 | 59 |
| 4 | sulfolane | 15 | 541 | 365 | 253 | 133 | 78 | 50 |
| 5 | 3,4-dichlorotoluene | 5 | 894 | 535 | 331 | 143 | 75 | 45 |
| 6 | Benzylbutylphthalate | 5 | No data | 722 | No data | No data | No data | No data |
| 7 | Caprolactone | 5 | No data | 752 | No data | No data | No data | No data |
| 8 | 3,4-dichlorotoluene | 10 | Not miscible | | | | | |
| 9 | 3,4-dichlorotoluene | 15 | Not miscible | | | | | |
| 10 | 1,2,4,5-tetrachlorobenzene | 5 | Not miscible | | | | | |
| 11 | N-methyl-2-pyrrilidone | 5 | Qualitatively measured at 25° C. as comparable to Examples 1 and 5. | | | | | |

TABLE 3

Viscosity (in cP) of Metal-Containing Ionic Liquid B and viscosity modifiers at various temperatures (in ° C.).

| Example | Ionic liquid/Viscosity modifier | Wt. % | Visc. @25 |
|---|---|---|---|
| Comp. 3 | Neat MCIL B | N/A | 34,000 |
| 12 | Propylene carbonate | 5 | 7,495 |
| 13 | 3,4-dichlorotoluene | 5 | 28,000 |
| 14 | Benzylbutylphthalate | 5 | 34,900 |
| 15 | Caprolactone | 5 | 9,433 |

TABLE 4

Viscosity (in cP) of Metal-Containing Ionic Liquid C and viscosity modifiers at various temperatures (in ° C.).

| Example | Ionic liquid/ Viscosity modifier | Wt. % | Visc. @ 20 | @ 25 | @ 30 | @ 40 | @ 50 | @ 60 |
|---|---|---|---|---|---|---|---|---|
| Comp. 4 | Neat MCIL-C | N/A | No data | 11669 | 6773 | 2580 | 1157 | 584 |
| 16 | Propylene carbonate | 5 | No data | 3428 | 2211 | 1006 | 493 | 282 |

TABLE 4-continued

Viscosity (in cP) of Metal-Containing Ionic Liquid C and viscosity modifiers at various temperatures (in °C.).

| Example | Ionic liquid/ Viscosity modifier | Wt. % | Visc. @ 20 | @ 25 | @ 30 | @ 40 | @ 50 | @ 60 |
|---|---|---|---|---|---|---|---|---|
| 17 | Caprolactone | 5 | No data | 5351 | 3254 | 1404 | 653 | 352 |
| 18 | sulfolane | 15 | No data | No data | No data | No data | No data | No data |
| 19 | 3,4-dichlorotoluene | 5 | colspan=6: Not miscible |
| 20 | 1,2,4,5-tetrachlorobenzene | 5 | colspan=6: Not miscible |
| 21 | Benzylbutylphthalate | 5 | colspan=6: Qualitatively comparable to Examples 16 and 17 at 25° C. |
| 22 | N-methyl-2-pyrrilidone | 5 | colspan=6: Observed degradation and precipitate formation at 25° C. |

ASPECTS

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A composition comprising:
  i) an ionic liquid comprising an ionic liquid cation and an ionic liquid anion;
  ii) a metal cation; and
  iii) a viscosity modifier.

Aspect 2. The composition of aspect 1, wherein the ionic liquid cation comprises an allylmethylimidazolium, a butylethylimidazolium, a butylmethylimidazolium, butyldimethylimidazolium, a decaethylimidazolium, a decamethylimidazolium, a diethylimidazolium, a dimethylimidazolium, an ethyl-2,4-dimethylimidazolium, an ethyldimethylimidazolium, an ethylimidazolium, an ethylmethylimidazolium, an ethylpropylimidazolium, an ethoxyethylmethylimidazolium, an ethoxydimethylimidazolium, a hexadecylmethylimidazolium, a heptylmethylimidazolium, a hexylethylimidazolium, a hexylmethylimidazolium, a hexyldimethylimidazolium, a methoxyethylmethylimidazolium, a methoxypropylmethylimidazolium, a methylimidazolium, a dimethylimidazolium, a methylnonylimidazolium, a methylnonylimidazolium, an octadecylmethylimidazolium, a hydroxyethylmethylimidazolium, a hydroxyoctylmethylimidazolium, a hydroxylpropylmethylimidazolium, an octylmethylimidazolium, an octyldimethylimidazolium, a phenylethylmethylimidazolium, a phenylmethylimidazolium, a phenyldimethylimidazolium, a pentylmethylimidazolium, a propylmethylimidazolium, 1-butyl-2-methylpyridinium, 1-butyl-3-methylpyridinium, a butylmethylpyridinium, 1-butyl-4-dimethylacetylpyridinium, 1-butyl-4-methylpyridinium, 1-ethyl-2-methylpyridinium, 1-ethyl-3-methylpyridinium, 1-ethyl-4-dim ethyl acetylpyridinium, 1-ethyl-4-methylpyridinium, a 1-hexyl-4-dimethylacetylpyridinium, a 1-hexyl-4-methylpyridinium, a 1-octyl-3-methylpyridinium, a 1-octyl-4-methylpyridinium, a 1-propyl-3-methylpyridinium, a 1-propyl-4-methylpyridinium, a butylpyridinium, an ethylpyridinium, a heptylpyridinium, a hexylpyridinium, a hydroxypropylpyridinium, an octylpyridinium, a pentylpyridinium, a propylpyridinium, a butylmethylpyrrolidinium, a butylpyrrolidinium, a hexylmethylpyrrolidinium, a hexylethylpyrrolidinium, a hexylpyrrolidinium, an octylmethylpyrrolidinium, an octylpyrrolidinium, a propylmethylpyrrolidinium, a butylammonium, a tributylammonium, a tetrabutylammonium, a butylethyldimethylammonium, a butyltrimethylammonium, N,N,N-trimethylethanolammonium, ethylammonium, diethylammonium, tetraethylammonium, a tetraheptylammonium, a tetrahexylammonium, methylammonium, dimethyl ammonium, tetramethylammonium, ammonium, a butyldimethylethanolammonium, dimethylethanolammonium, ethanolammonium, ethyldimethylethanolammonium, a tetrapentylammonium, a tetrapropylammonium, a tetrabutylphosphonium, a tributyloctylphosphonium, or combinations thereof.

Aspect 3. The composition of aspect 1 or 2, wherein the ionic liquid anion comprises bis(trifluoromethanesulfonyl) imide, bis(fluorosulfonyl)imide, hexafluorophosphate, trifluoromethanesulfonate, dicyanamide, tetrafluoroborate, thiocyanate, nitrate, sulfonate, methylsulfate, methanesulfonate, trifluoroacetate, acetate, or combinations thereof.

Aspect 4. The composition of any one of aspects 1-3, wherein:
  the ionic liquid cation is an allylmethylimidazolium, an ethylmethylimidazolium, (1-(2-cyanoethyl))-3-methylimidazolium, a propenylmethylimidazolium, a propargylmethylimidazolium, a butylmethylimidazolium, a butylmethylpyridinium, or combinations thereof; and
  the ionic liquid anion is bis(trifluoromethanesulfonyl) imide, hexafluorophosphate, trifluoromethanesulfonate, dicyanamide, tetrafluoroborate, thiocyanate, nitrate, sulfonate, methyl sulfate, or combinations thereof.

Aspect 5. The composition of any one of aspects 1-4, wherein:
  the ionic liquid cation is (1-(2-cyanoethyl))-3-methylimidazolium or N,N-allylmethylimidazolium; and
  the ionic liquid anion is bis(trifluoromethanesulfonyl) imide.

Aspect 6. The composition of any one of aspects 1-5, wherein the metal cation is a copper cation or a silver cation.

Aspect 7. The composition of any one of aspects 1-6, wherein the metal cation is provided as a metal salt.

Aspect 8. The composition of any one of aspects 1-7, wherein the metal salt is copper(I) bis(trifluoromethanesulfonyl)imide.

Aspect 9. The composition of any one of aspects 1-8, wherein the composition has a metal cation concentration in a range from 1 M to 2 M.

Aspect 10. The composition of any one of aspects 1-9, wherein an amount of the viscosity modifier is in a range from 3 wt. % to 25 wt. % of the ionic liquid.

Aspect 11. The composition of aspect 10, wherein the amount of the viscosity modifier is less than or equal to 10 wt. % of the ionic liquid.

Aspect 12. The composition of any one of aspects 1-11, wherein the viscosity modifier has:
- a dipole moment of at least 2.5 D;
- a Hansen solubility hydrogen-bonding parameter in a range from 2 to 11;
- a Hansen solubility dispersion parameter in a range from 17 to 21;
- a Hansen solubility polarity parameter in a range from 9 to 19;
- a boiling point at standard temperature and pressure of at least 150° C.;
- or any combination thereof.

Aspect 13. The composition of any one of aspects 1-12, wherein the viscosity modifier comprises 3,4-dichlorotoluene, sulfolane, N-methylpyrrolidinone, caprolactone, propylene carbonate, benzylbutylphthalate, or any combination thereof.

Aspect 14. The composition of any one of aspects 1-13, wherein the composition has a viscosity less than or equal to 80% (e.g., less than or equal to 70%) of an otherwise identical composition without the viscosity modifier.

Aspect 15. The composition of any one of aspects 1-14, wherein the composition has a viscosity of less than or equal to 500 cP (or less than or equal to 200 cP) at 40° C.

Aspect 16. The composition of any one of aspects 1-15, wherein the composition has an ethylene capacity at 0.10 MPa ethylene of at least 1 mol/L.

Aspect 17. The composition of any one of aspects 1-16, wherein the composition has an ethylene capacity that is at least 75% of an otherwise identical composition without the viscosity modifier.

Aspect 18. The composition of any one of aspects 1-17, wherein the composition has an ethylene capacity that is at least 90% of an otherwise identical composition without the viscosity modifier.

Aspect 19. The composition of any one of aspects 1-18, wherein the composition has an ethylene:ethane molar selectivity of from 15:1 to 200:1 (or from 25:1 to 150:1).

Aspect 20. The composition of any one of aspects 1-19, further comprising ethylene.

Aspect 21. The composition of aspect 20, comprising from 0.1 wt. % to 3 wt. % ethylene based on the weight of the composition.

Aspect 22. A method for reducing the viscosity of an ionic liquid, the method comprising combining the ionic liquid with a viscosity modifier to form a composition (e.g., a composition of any one of aspects 1-19) having a viscosity less than or equal to 80% of the ionic liquid.

Aspect 23. A method for separating ethylene from a process stream, the method comprising:
- contacting the process stream comprising ethylene and a metal-containing ionic liquid (e.g., a composition of any one of aspects 1-19) to form an ethylene-rich metal-containing ionic liquid (e.g., a composition of aspect 20 or 21) comprising ethylene captured from the process stream;
- separating the ethylene-rich metal-containing ionic liquid from the process stream;
- releasing ethylene from the ethylene-rich metal-containing ionic liquid to form an ethylene-poor metal-containing ionic liquid.

Aspect 24. The method of aspect 23, wherein the process stream is a gaseous process stream.

Aspect 25. The method of aspect 23 or 24, wherein contacting the process stream and the metal-containing ionic liquid comprises flowing the metal-containing ionic liquid at a metal-containing ionic liquid flow rate in a range from 1,000 pounds per hour to 300,000 pounds per hour.

Aspect 26. The method of any one of aspects 23-25, wherein the process stream has a process stream flow rate in a range from 10 pounds per hour to 3,000 pounds per hour.

Aspect 27. The method of aspect 26, wherein a mass flow ratio of the metal-containing ionic liquid flow rate to the process stream flow rate is in a range from 10 to 300 (e.g., from 10 to 100).

Aspect 28. The method of any of aspects 23-27, wherein contacting the process stream and the metal-containing ionic liquid comprises flowing the metal-containing ionic liquid countercurrent with respect to the process stream.

Aspect 29. The method of any one of aspects 23-28, wherein contacting the process stream and the metal-containing ionic liquid comprises:
- flowing a gaseous process stream into a separator tank through a first inlet and to a first outlet positioned above the first inlet; and
- flowing the metal-containing ionic liquid into the separator tank through a second inlet positioned above the first inlet, and to a second outlet positioned below the second inlet.

Aspect 30. The method of any one of aspects 23-29, comprising contacting the process stream and the metal-containing ionic liquid at a contact temperature in a range from 5° C. to 50° C. (or from 20° C. to 40° C.).

Aspect 31. The method of any one of aspects 23-30, comprising contacting the process stream and the metal-containing ionic liquid at a contact pressure in a range from 100 psia to 250 psia.

Aspect 32. The method of any one of aspects 23-31, wherein contacting the process stream and the metal-containing ionic liquid causes the metal-containing ionic liquid to capture ethylene in the process stream (e.g., at least 80 wt. %, at least 90 wt. %, at least 95 wt. % of ethylene in the process stream).

Aspect 33. The method of aspect 32, wherein releasing ethylene from the ethylene-rich metal-containing ionic liquid comprises releasing at least 90 wt. % ethylene (e.g., at least 95 wt. %, at least 98 wt. %, at least 99 wt. %) from the ethylene-rich metal-containing ionic liquid.

Aspect 34. The method of aspect 33, further comprising recovering the released ethylene (e.g., at least 90 wt. %, at least 95 wt. %, at least 98 wt. % of the released ethylene).

Aspect 35. The method of aspect 34, wherein the recovered ethylene has a purity of at least 90 wt. % (e.g., at least 95 wt. %, at least 98 wt. %).

Aspect 36. The method of any one of aspects 23-35, wherein releasing ethylene from the ethylene-rich metal-containing ionic liquid comprises heating the ethylene-rich metal-containing ionic liquid to a recovery temperature in a range from 60° C. to 450° C.

Aspect 37. The method of any one of aspects 23-36, wherein releasing ethylene from the ethylene-rich metal-containing ionic liquid comprises a recovery pressure in a range from 5 psia to 50 psia.

Aspect 38. The method of any one of aspects 23-37, wherein the process stream further comprises isobutane.

Aspect 39. The method of any one of aspects 23-38, wherein the ethylene-rich metal-containing ionic liquid comprises isobutane.

Aspect 40. The method of any one of aspects 23-39, wherein the process stream comprises an amount of ethylene in range from 5 to 50 wt. %, a partial pressure in a range from 20 to 200 psia, or both.

Aspect 41. The method of any one of aspects 23-40, further comprising returning the ethylene-poor metal-containing ionic liquid to contact the process stream.

Aspect 42. Copper(I) bis(trifluoromethanesulfonyl)imide.

Aspect 43. A composition comprising copper(I) bis(trifluoromethanesulfonyl)imide.

Aspect 44. The composition of aspect 43, further comprising a viscosity modifier.

Aspect 45. The composition of aspect 44, further comprising ethylene.

We claim:

1. A composition comprising:
   i) an ionic liquid comprising an ionic liquid cation and an ionic liquid anion;
   ii) a metal cation selected from a copper cation and/or a silver cation; and
   iii) a viscosity modifier; wherein:
      the ionic liquid cation is (1-(2-cyanoethyl))-3-methylimidazolium or N,N-allylmethylimidazolium; and
      the ionic liquid anion is bis(trifluoromethanesulfonyl)imide.

2. The composition of claim 1, wherein the metal cation is the copper cation.

3. The composition of claim 1, wherein the composition has a metal cation concentration in a range from 0.5 M to 2 M.

4. The composition of claim 1, wherein an amount of the viscosity modifier is in a range from 3 wt. % to 20 wt. % of the ionic liquid.

5. The composition of claim 1, wherein the viscosity modifier has:
   a dipole moment of at least 2.5 D;
   a Hansen solubility hydrogen-bonding parameter in a range from 2 to 11;
   a Hansen solubility dispersion parameter in a range from 17 to 21;
   a Hansen solubility polarity parameter in a range from 9 to 19;
   a boiling point at standard temperature and pressure of at least 150° C.;
   or any combination thereof.

6. The composition of claim 1, wherein the viscosity modifier has:
   a Hansen solubility hydrogen-bonding parameter in a range from 4 to 9;
   a Hansen solubility dispersion parameter in a range from 17 to 21; and
   a Hansen solubility polarity parameter in a range from 11 to 19.

7. The composition of claim 1, wherein the viscosity modifier comprises 3,4-dichlorotoluene, sulfolane, N-methylpyrrolidinone, caprolactone, propylene carbonate, benzylbutylphthalate, or any combination thereof.

8. The composition of claim 1, wherein the composition has a viscosity that is less than or equal to 80% of an otherwise identical composition without the viscosity modifier.

9. The composition of claim 1, wherein the composition has a viscosity of less than or equal to 500 cP at 40° C.

10. The composition of claim 1, wherein the composition has an ethylene capacity at 0.10 MPa ethylene of at least 1 mol/L.

11. The composition of claim 1, wherein the composition has an ethylene capacity that is at least 90% of an otherwise identical composition without the viscosity modifier.

12. The composition of claim 1, wherein the composition has an ethylene:ethane molar selectivity of 15:1 to 200:1.

13. The composition of claim 1, further comprising ethylene.

14. The composition of claim 1, wherein the viscosity modifier comprises sulfolane, propylene carbonate, or both.

15. The composition of claim 1, wherein:
   the composition has a metal cation concentration in a range from 0.5 M to 2 M; and
   an amount of the viscosity modifier is in a range from 3 wt. % to 20 wt. % of the ionic liquid.

16. The composition of claim 12, wherein the viscosity modifier has a boiling point at standard temperature and pressure of at least 150° C.

17. The composition of claim 12, wherein the viscosity modifier comprises 3,4-dichlorotoluene, sulfolane, N-methylpyrrolidinone, caprolactone, propylene carbonate, or any combination thereof.

18. The composition of claim 12, wherein the composition has a viscosity of less than or equal to 500 cP at 40° C.

19. The composition of claim 12, wherein the composition has:
   a viscosity that is less than or equal to 80% of an otherwise identical composition without the viscosity modifier;
   an ethylene capacity at 0.10 MPa ethylene of at least 1 mol/L;
   an ethylene capacity that is at least 90% of an otherwise identical composition without the viscosity modifier;
   an ethylene:ethane molar selectivity of 15:1 to 200:1; or
   any combination thereof.

20. The composition of claim 15, further comprising ethylene.

21. The composition of claim 1, wherein:
   the metal cation is the copper cation; and
   the viscosity modifier comprises sulfolane, propylene carbonate, or both.

22. The composition of claim 21, wherein:
   the composition has a metal cation concentration in a range from 0.5 M to 2 M; and
   an amount of the viscosity modifier is in a range from 3 wt. % to 20 wt. % of the ionic liquid.

23. The composition of claim 22, wherein the metal cation concentration is in a range from 0.75 M to 2 M.

24. The composition of claim 21, further comprising ethylene.

25. The composition of claim 24, wherein:
   the composition has a metal cation concentration in a range from 0.5 M to 2 M; and
   an amount of the viscosity modifier is in a range from 3 wt. % to 20 wt. % of the ionic liquid.

* * * * *